May 12, 1925.
G. H. LOBER
1,537,538
WINDSHIELD WIPER OPERATING MECHANISM
Filed July 9, 1921
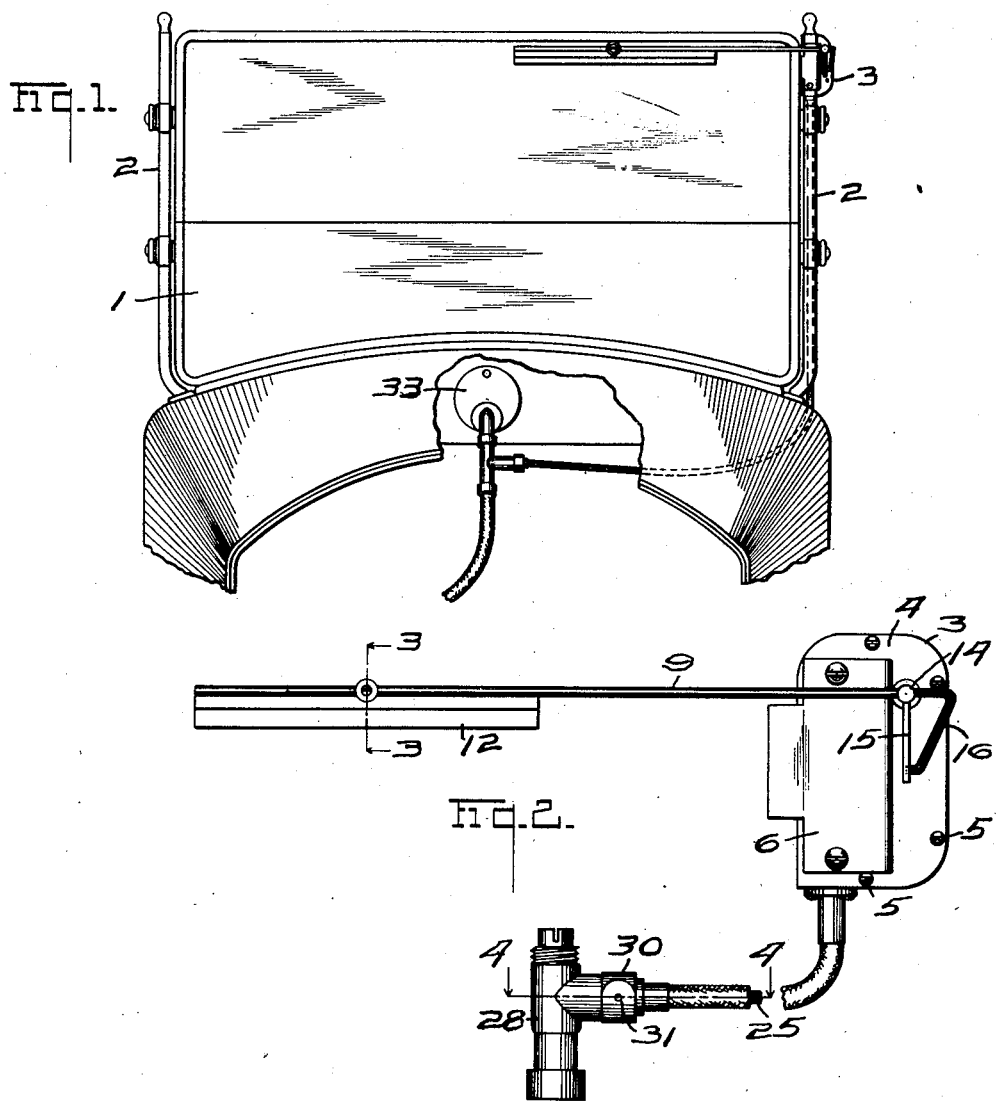

Patented May 12, 1925.

1,537,538

UNITED STATES PATENT OFFICE.

GEORGE H. LOBER, OF TOLEDO, OHIO.

WINDSHIELD-WIPER-OPERATING MECHANISM.

Application filed July 9, 1921. Serial No. 483,395.

*To all whom it may concern:*

Be it known that I, GEORGE H. LOBER, a citizen of the United States, and a resident of Toledo, in the county of Lucas and State of Ohio, have made an Invention Appertaining to Windshield-Wiper-Operating Mechanism; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention has for its object to provide an efficient continuously operated wind shield wiper commonly known as an automatic wiper. The invention provides a means whereby the wiper may be operated mechanically as distinct from electrically, whereby a positive means is provided for operating the wiper. The invention provides a means for operating the wiper from some operative mechanism of the automobile. It particularly provides means whereby the wiper may be easily connected mechanically to the shaft that operates the speedometer of an automobile.

The invention may be contained in structures of different forms and yet be within the purview of the scope of my invention as contained broadly and specifically in the combinations of elements given in the appended claims. To show a practical application of the invention I have selected a structure containing the invention as an example of such structures and shall describe it hereinafter. The structure selected is illustrated in the accompanying drawings.

Figure 1 of the drawings illustrates a wind shield showing the wiper mounted. Fig. 2 is an enlarged broken view of the wiper. Fig. 3 is a sectional view taken on the line 4—4 indicated in Fig. 2.

1, Fig. 1, is the wind shield having the supporting posts 2 for supporting the wind shield on the automobile. A case 3 having a cover 4 is secured to one of the posts 2 or it may be secured to the frame of the wind shield at any desired or convenient point. The cover is secured to the case by means of the screws 5. To the cover is attached a clip or U-shaped elastic sheet metal member 6 that may be of any suitable shape for securing the case 3 to the wind shield at any desired point, but preferably at such a point that the wiper stroke will be in the line of vision of the operator of the automobile. The case 3 may be clamped in position by means of the screws 7.

The wiper is operated by the flexible shaft 25 and means is provided for connecting and disconnecting the flexible shaft of the wiper to and from the flexible shaft of the speedometer of the automobile.

The flexible shaft 25 is connected to a bevelled gear wheel 26 and a collar 27 surrounds a solid shaft of the gear wheel 26. The gear wheel 26 and the collar 27 are located in a shell or T 28. The collar 27 is provided with a pair of channels 29 having rounded corners. An elastic collar 30 is provided with a pin 31 that extends through an opening formed in the shell 28 and into one or the other of the channels 29. The bevelled gear 26 may be readily inserted in the shell 28 by pushing the collar 27 by the pin 31. The bevelled gear 32 is secured to the shaft 31 which is connected to the flexible shaft of the speedometer 33. When the collar 27 is pushed in far enough and so that the pin 31 enters the outermost of the channels 29 the gear wheels 26 and 32 mesh and operation of the speedometer by its flexible shaft also operates the wiper through its flexible shaft. Disconnection may be readily made by merely pulling the flexible shaft 25 and preferably so as to cause the pin 31 to register with the other channel 29. In this way connection may be readily established or disconnection readily made to cause the operation of the wiper. The speedometer being always conveniently located to the hand of the driver, it affords a very convenient form and yet at the same time it affords an exceedingly efficient source of energy for operating the wiper when needed.

I claim:

1. In a mechanism for operating a wiper of an automobile having a speedometer, a shell, a pair of gear wheels located in the shell, one of the gear wheels connected to the flexible drive shaft of the speedometer, the other of the gear wheels connected to the wiper mechanism, a collar connected to the last named gear wheel and having a pair of channels, an elastic member for entering one or the other of the channels for engaging the collar to hold the gear wheels either in mesh or out of mesh.

2. In a clutch mechanism, a shell, a pair of gear wheels located within the shell, means for driving one of the gear wheels, a flexible shaft connected to one of the gear wheels, means for yieldingly holding one of the gear wheels in and out of mesh with the other of the gear wheels and connected to the flexible shaft and operated by pulling or pushing the flexible shaft near the end where it is connected with the gear wheel.

In testimony whereof, I have hereunto signed my name to this specification.

GEORGE H. LOBER.